US005480172A

United States Patent [19]

James

[11] Patent Number: 5,480,172

[45] Date of Patent: Jan. 2, 1996

[54] THREE-WHEELED COMPETITION WHEELCHAIR HAVING AN ADJUSTABLE CENTER OF MASS

[75] Inventor: Dean W. James, Clovis, Calif.

[73] Assignee: Quickie Designs Inc., Fresno, Calif.

[21] Appl. No.: 275,446

[22] Filed: Jul. 15, 1994

[51] Int. Cl.[6] .............................. A61G 5/00; B62M 1/14

[52] U.S. Cl. ....................... 280/250.1; 280/650; 280/642; 297/DIG. 4

[58] Field of Search .............................. 280/250.1, 304.1, 280/650, 647, 642; 297/DIG. 4, 344.13, 344.1

[56] References Cited

U.S. PATENT DOCUMENTS

| | | | |
|---|---|---|---|
| 4,405,142 | 9/1983 | Whetstine | 297/DIG. 4 X |
| 4,592,570 | 6/1986 | Nassiri | 280/650 |
| 4,887,826 | 12/1989 | Kantner | 280/650 X |
| 4,892,323 | 1/1990 | Oxford | 280/250.1 |
| 5,011,175 | 4/1991 | Nicholson et al. | 280/650 X |
| 5,149,118 | 9/1992 | Oxford | 280/250.1 |
| 5,242,180 | 9/1993 | Bergeron | 280/250.1 |
| 5,259,635 | 11/1993 | Picker | 280/250.1 |
| 5,294,142 | 3/1994 | Weege | 280/250.1 X |
| 5,301,964 | 4/1994 | Papac | 297/DIG. 4 X |
| 5,356,172 | 10/1994 | Levy et al. | 280/650 |

FOREIGN PATENT DOCUMENTS

| | | | |
|---|---|---|---|
| 2141980 | 1/1985 | United Kingdom | 280/250.1 |
| 4011235 | 5/1994 | WIPO | 280/250.1 |

OTHER PUBLICATIONS

Advertisements by Action for the TOP END $T_3$.

Advertisement by Eagle Sportschairs for Their Screaming Eagle (V and T–frame), Hurricane and Tornado Competition Wheelchairs.

*Primary Examiner*—Margaret A. Focarino
*Assistant Examiner*—F. Zeender
*Attorney, Agent, or Firm*—Flehr, Hohbach, Test, Albritton & Herbert

[57] ABSTRACT

A three-wheeled competition wheelchair apparatus (10) including a wheelchair frame (11) having a beam (12) extending generally from an aft portion to a fore portion thereof. A seat assembly (15) includes a seat frame (16) carried by and supported on the wheelchair frame (11). A footrest assembly (17) includes a seat support post (20, 20') having one end movably mounted to the seat frame (16), and an opposite end, carrying footrest plates (21, 21), which is movably mounted longitudinally along the frame beam (12). The three-wheeled competition wheelchair (10) permits selective adjustment of the footrest assembly (17) between the fore and the aft position of the beam (12). Hence, the cumulative center of gravity of the wheelchair apparatus (10) and the occupant can be moved closer to effect the cumulative moment of inertia about the wheelchair pivoting vertical axis to enable more stable and shorter radius turning.

27 Claims, 3 Drawing Sheets

THREE-WHEELED COMPETITION WHEELCHAIR HAVING AN ADJUSTABLE CENTER OF MASS

TECHNICAL FIELD

The present invention relates, generally, to competition wheelchairs and, more particularly, three-wheeled competition wheelchairs.

BACKGROUND ART

Sports activities and competitive sports involving physically disabled persons have experienced tremendous growth in recent years. This has led to large organized competitive events, such as the Handicapped Olympics, for those physically handicapped athletes willing and able to participate. Hence, these serious athletic competitions are a source of accomplishment and well deserved pride amongst the participants.

Often, these organized competitive events require special or modified wheelchairs which are lighter, more agile and easier to manually maneuver. These competitive wheelchairs typically include lightweight wheelchair frames composed of high strength aluminum, carbon fibers or composite fiberglass. Further, these competitive chairs include a pair of front caster wheels and a pair of negative cambered rear drive wheels which add stability at high speeds by increasing the rear wheelbase.

While four-wheeled competitive wheelchairs are generally superior to conventional wheelchairs for most sport activities, especially competitive racing (sprint and distance), their capabilities are limited. For instance, in wheelchair sports requiring relatively sharp or short radius turning of the wheelchair, such as tennis, basketball, softball, rugby and football, these four-wheeled designs are somewhat cumbersome in sharp turns.

In an attempt to overcome these deficiencies, three-wheeled competition wheelchairs have been developed which are lighter in weight, capable of shorter radius turns, and provide less rolling resistance, such as the T-3™ by TOP END. The primary problem associated with these wheelchairs is that the wheelchair frame are often fixed frames which lack sufficient adjustability to accommodate the operator's specific needs on certain surfaces. For example, on softer surfaces, such as grass or clay, the front wheel is more difficult and laborious to maneuver. By moving the cumulative center of gravity of the wheelchair and the occupant rearward, less weight is centered over the front wheel, which eases turning. This is especially true in handicapped tennis where, depending upon the surface composition (i.e., clay, concrete, asphalt or grass), the ride, handling and speed capabilities of the wheelchair will differ depending upon the particular adjustments.

In some designs, the rear drive wheels can be moved more forward to move the cumulative center of gravity. This, however, may be problematic when the front-to-rear wheelbase distance is decreased which results in greater instability. In other designs, the position of the footrest device can be moved slightly forward and aft to accommodate the occupant's legs and feet. However, since the wheelchair frame is relatively fixed, the seat, carried atop the frame, cannot be adjusted relative the wheelchair frame for overall comfort.

DISCLOSURE OF INVENTION

Accordingly, it is an object of the present invention to provide a three-wheeled competition wheelchair which can be easily maneuvered by physically handicapped persons.

It is another object of the present invention to provide a three-wheeled competition wheelchair which is capable of selectively positioning of the cumulative center of gravity of the wheelchair and the occupant.

Still another object of the present invention is to provide a three-wheeled competition wheelchair which provides a plurality of comfort adjustments.

Yet another object of the present invention is to provide a three-wheeled competition wheelchair which improves participation competitiveness.

It is a further object of the present invention to provide a three-wheeled competition wheelchair which is durable, compact, easy to maintain, has a minimum number of components, is easy to use by unskilled personnel, and is economical to manufacture.

The three-wheeled wheelchair apparatus of the present invention includes a wheelchair frame having an aft portion and a fore portion, and at least one beam extending generally from the aft portion to the fore portion. A pair of rear drive wheels is mounted to the wheelchair frame proximate the aft portion; while a front wheel is rotatably mounted to the wheelchair frame proximate the fore portion. The wheelchair further includes a seat assembly carried by and supported on the wheelchair frame, and a footrest assembly including a seat support post having one end movably mounted to the seat frame, and an opposite end carrying footrest plates and movably mounted longitudinally along the beam. Hence, the frame of this three-wheeled competition wheelchair can be selectively adjusted for positioning of the footrest plates and the seat assembly such that the location of a combined center of gravity of the wheelchair apparatus and the user supported thereon can be changed.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

BEST MODE OF CARRYING OUT THE INVENTION

Figure 1:
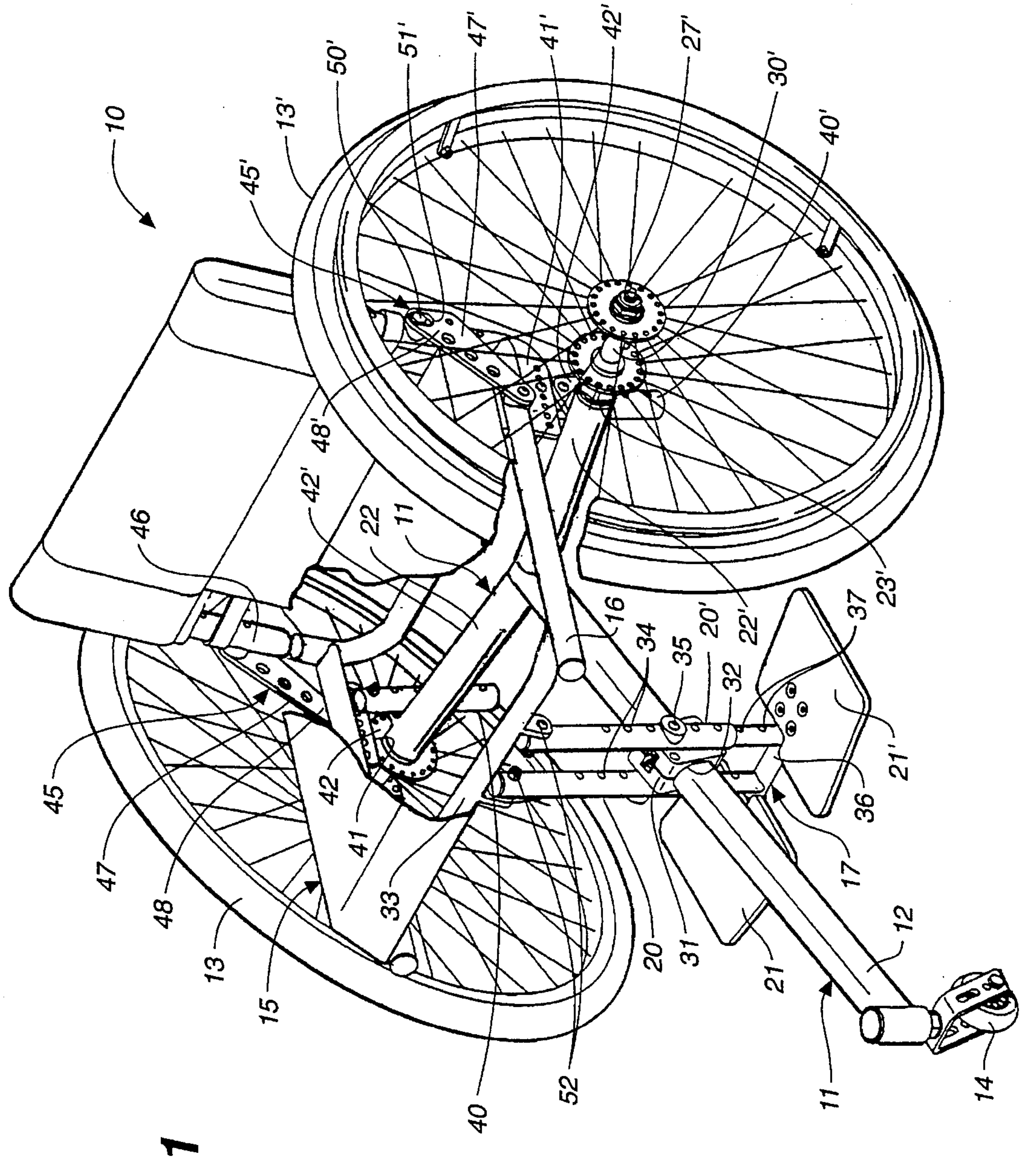
FIG. 1 is a top perspective view of a three-wheeled competition wheelchair apparatus constructed in accordance with the present invention.

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Attention is now directed to FIG. 1, where the three-wheeled competition wheelchair apparatus, generally designated 10, is illustrated. Briefly, wheelchair apparatus 10 includes a wheelchair frame, generally designated 11, having a beam 12 extending generally from an aft portion to a fore portion of the wheelchair. A pair of rear drive wheels 13, 13' is rotatably mounted to wheelchair frame 11 proximate the aft portion thereof, while a front wheel 14 is rotatably mounted to wheelchair frame 11 proximate the fore portion thereof. The wheelchair apparatus 10 further includes a seat assembly, generally designated 15, having a seat frame 16 carried by and supported on wheelchair frame 11, and a footrest assembly, generally designated 17, including seat support posts 20, 20' having one end movably mounted to seat frame 16, and an opposite end carrying footrest plates 21, 21' and movably mounted longitudinally along wheelchair frame beam 12.

In accordance with the present invention, this frame arrangement (i.e., wheelchair frame 11 and seat frame 16) of the three-wheeled competition wheelchair 10 permits selective adjustment thereof for positioning of the footrest assembly in a selected one of a plurality of positions relative the seat frame and the wheelchair frame between the fore and the aft positions. The occupant's legs and feet, thus, can be repositioned along beam 12 such that the location of a combined center of gravity (CG) (not shown) of the wheelchair apparatus and the user supported thereon can be changed. Hence, by moving the cumulative center of gravity closer to the pivotal vertical axis of wheelchair apparatus 10 (i.e., the vertical axis about which the wheelchair turns), the cumulative moment of inertia about the vertical axis can be reduced which enables shorter radius and more rapid turning. Moreover, additional adjustments of the present invention, as will be discussed, such as ride height, seat angle, footrest plate angle, camber angle and backrest angle further enhance ride comfort, handling and speed capabilities of the wheelchair.

Figure 3:
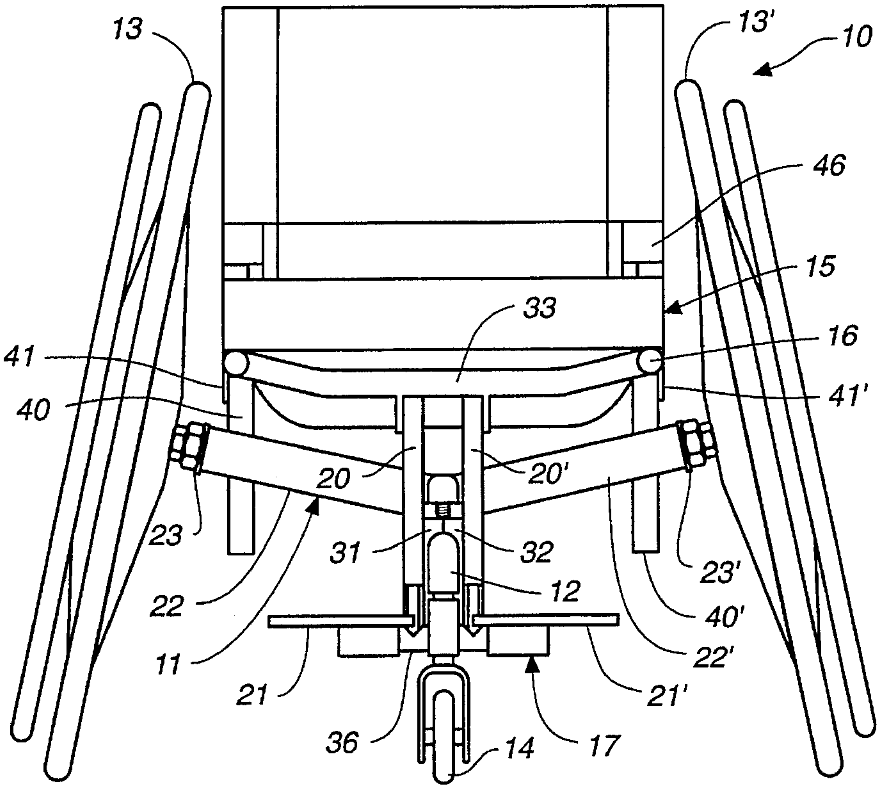
FIG. 3 is a front elevation view of the three-wheeled competition wheelchair apparatus of FIG. 1.

FIG. 1 illustrates that wheelchair frame 11 is generally T-shaped having a pair of opposed arms 22, 22' extending laterally from beam 12 proximate the aft portion thereof. The outer distal end of each tubular arm 22, 22' houses an axle sleeve formed to rotatably mount respective rear drive wheels 13, 13' thereto. Each arm 22, 22' is upwardly sloped at approximate an seventy eight (78) degree angle (FIG. 3) to a bisecting vertical plane extending through the wheelchair (or a 12 degree angle to a horizontal plane). Thus, rotatably mounted rear drive wheels 13, 13' have a negative (inward) camber angle of approximately twelve (12) degrees.

Figure 4:
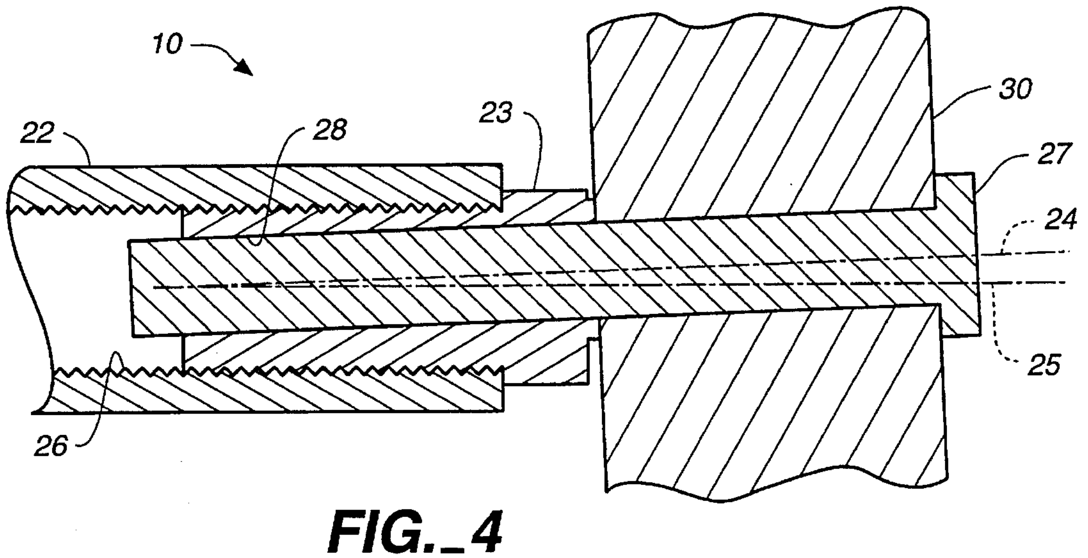
FIG. 4 is an enlarged, fragmentary, side elevation view, in cross-section, of an axle sleeve producing a two degree off-set of the camber angle for the rear drive wheel mounted to the three-wheeled competition wheelchair apparatus of FIG. 1.

In the preferred form, the camber of each rear drive wheel 13, 13' is adjustable, as shown in FIG. 4, by providing axle sleeve 23 with a bore 28 having a rotation axis 24 angularly off-set from a longitudinal axis 25 of sleeve 23. Axle sleeve 23 is threadably received in longitudinal sockets 26 provided at distal ends of frame arms 22, 22'. A conventional quick-release pin 27 releasably mounts a hub 30 of rear drive wheel 13 to axle sleeve 23 for rotation thereof. Hence, depending upon the orientation of axle sleeve 23 relative respective arm 22, the camber angle of the rear drive wheel can be increased or decreased by an amount equivalent to the angular off-set.

Preferably, this off-set is about two (2) degrees which, depending upon the axle sleeve orientation, provides a ±two (2) degrees change from the ten (12) degree camber angle of tilted arms 22, 22'. It will be appreciated, of course, that this off-set angle may vary by providing axle sleeves 23 having different angled off-set bore 28 without departing from the true spirit and nature of the present invention.

At the fore end of beam 12 of T-shaped wheelchair frame 11 is front mounted caster wheel 14 which stabilizes the wheelchair. Beam 12 is angled downwardly toward the fore portion of wheelchair frame 11, and is preferably a tubular member with an elongated cylindrical or substantially elliptical shaped in transverse cross-section, with the long axis oriented in a vertical plane for strength.

Figure 2A:
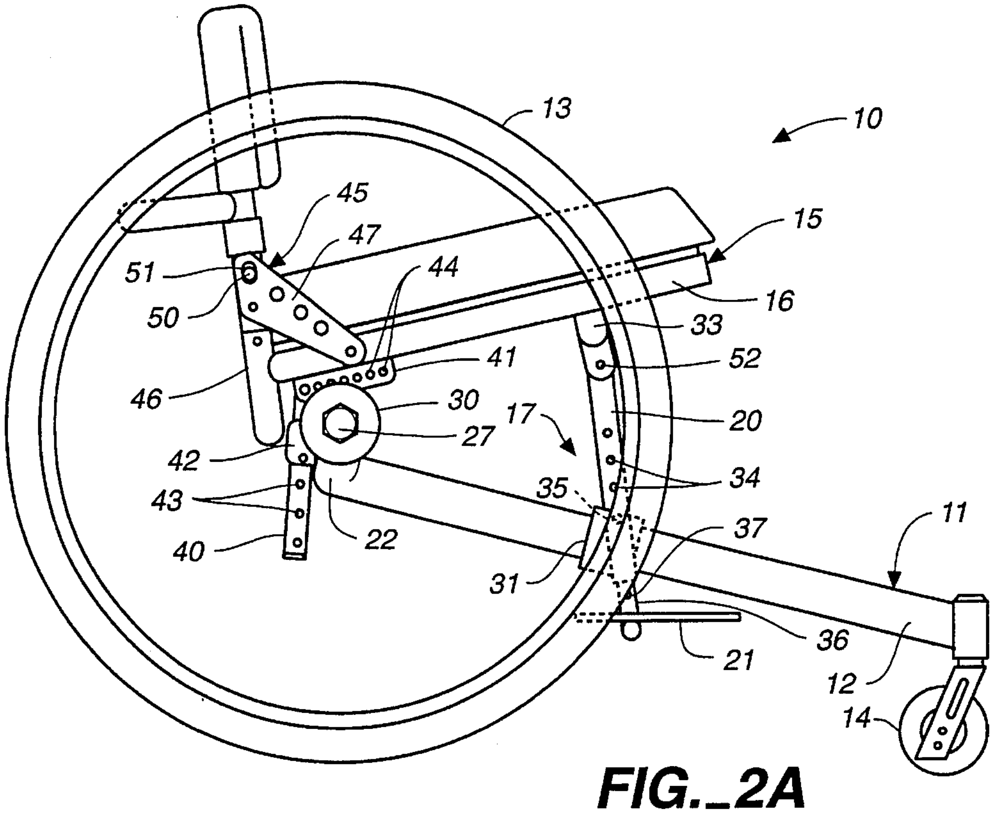
FIGS. 2A and 2B are side elevation views, partially broken away, of the three-wheeled competition wheelchair apparatus of FIG. 1, and illustrating the multiple adjustment features of the present invention.
Figure 2B:
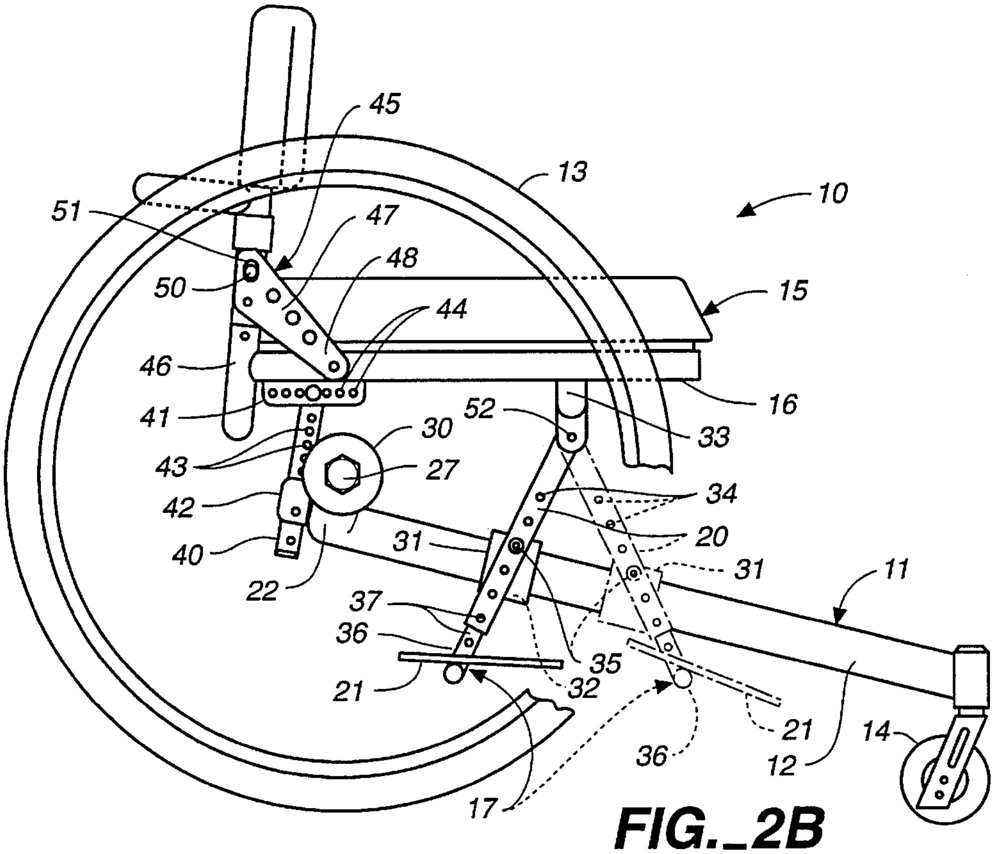

As best viewed in FIGS. 2A and 2B, footrest assembly 17 includes a support clamp 31 having a passageway 32 dimensioned for sliding receipt of beam 12 longitudinally therethrough. Support clamp 31 is pivotally mounted at pivotal mounting pin 35 to seat support posts 20, 20' which straddle support clamp 31. Upper distal ends of support posts 20, 20' are pivotally mounted at mounting assemblies 52 to a front cross member 33 of seat frame 16. Each support post includes a plurality of spaced apertures 34 extending longitudinally therealong in which a selected one is to be aligned with a pivot hole (not shown) extending through support clamp 31.

Upon alignment of the selected aperture with the clamp pivot hole, a mounting bolt 35 extends therethrough to pivotally retain the support clamp to the support posts. Hence, this cooperation permits pivoting of support clamp 31 relative support posts 20, 20' as the support clamp is positioned between the fore end and the aft end of beam 12. Further, the plurality of apertures 34 and mounting bolt 35 enables selective raising and lowering of front cross member 33 relative support clamp 31, depending upon which aperture is selected. Once the desired position has been determined, the mounting bolt can be tightened to lock support clamp 31 in place relative beam 12.

When support clamp 31 is selectively positioned forward or rearward longitudinally along beam 12, as viewed in FIG. 2B, the cumulative weight of the footrest assembly and the occupant's lower legs and feet (not shown) move the cumulative CG respectively forward or rearward. Accordingly, without moving the wheelbase dimensions (i.e., decreasing stability) the present invention employs the frame network of the wheelchair to enhance the wheelchair turning capabilities by increasing or decreasing the cumulative moment of inertia about the vertical pivotal axis thereof.

FIG. 1 further illustrates that footrest assembly 17 includes a footrest frame 36 telescopically mounted to support posts 20, 20' for extension and retraction of footrest plate mounted thereto. Preferably, footrest plates 21, 21' are pivotally carried by and support on footrest frame 36 for additional adjustment and comfort (FIG. 2B). The support posts are preferably tubular having a socket formed for sliding receipt of the upper distal ends of footrest frame 36. A plurality of spaced apart holes 37 extend through footrest frame which are formed to be selectively aligned with the support clamp pivot hole and the selected support post apertures 34 for receipt of mounting bolt 35 therethrough. Hence, footrest plates 21, 21' can be selectively moved toward and away from the support posts.

To adjust the rear height of seat frame 16 relative wheelchair frame 11, a pair of rear post members 40, 40' are positioned proximate the aft portion of wheelchair frame 11. A top end of each rear post member 40, 40' is releasably and pivotally mounted to a corresponding post mounting bracket 41, 41' extending downwardly from seat frame 16. The remaining portion of post member 40, 40' is releasably mounted to a corresponding flange 42, 42' of a respective arm 22, 22' of wheelchair frame 11.

Each rear post member provides a plurality of spaced apart apertures 43, 43' (FIG. 2) extending longitudinally therealong in which a selected one of the apertures is to be aligned with a respective mounting hole (not shown) in the corresponding flanges 42, 42'. Accordingly, as best viewed in FIGS. 2A and 2B, the rear post members can be moved longitudinally therealong so that the aft portion of seat frame 16 can be raised and lowered relative wheelchair frame 11.

In the preferred embodiment, each post mounting bracket 41, 41' further includes a plurality of spaced-apart holes 44 (FIG. 2) extending from a forward portion to a rearward portion thereof. A selected one of the holes of each bracket cooperates with a respective rear post to position seat assembly 15 forward or rearward relative wheelchair frame 11.

Seat assembly 15 further includes a backrest angle adjustment 45, 45' which enables the backrest frame 46 to be adjustably positioned relative seat frame 16. As shown in FIG. 1, a pair of backrest brackets 47, 47' are provided each having one end 48, 48' pivotally mounted to wheelchair frame 11, while the other ends thereof are mounted to opposite sides of backrest frame 46. Each backrest angle adjustment 45, 45' includes a slot 50 formed in a surface of backrest brackets 47, 47' which slidably receives the head of mounting eccentric bolt 51 therein mounting the respective backrest bracket to the backrest frame. Accordingly, by sliding the mounting eccentric bolt head along slot 50, the angle of the backrest frame relative the seat frame can be adjusted.

The combination of frame adjustments in the three-wheeled competition wheelchair of the present invention, therefore, allows each individual user to easily adjust the chair configuration to achieve maximum comfort and performance, depending on the conditions in which the wheelchair is being used.

What is claimed is:

1. A three-wheeled wheelchair apparatus comprising:

a wheelchair frame having an aft portion and a fore portion, and including at least one beam extending generally from said aft portion to said fore portion;

a pair of rear drive wheels rotatably mounted to said wheelchair frame proximate said aft portion;

a front wheel rotatably mounted to said wheelchair frame proximate said fore portion;

a seat assembly carried by and supported on said wheelchair frame;

a footrest assembly including a seat support post having one end movably mounted to said seat assembly, and an opposite end carrying footrest plates, and the footrest assembly being movably mounted longitudinally along said at least one beam for positioning of said footrest plates in a selected one of a plurality of positions relative said seat assembly and said wheelchair frame such that the location of a combined center of gravity of the wheelchair apparatus and the user supported thereon can be changed.

2. The three-wheeled wheelchair apparatus as defined in claim 1 wherein, said seat assembly includes a seat frame, and said seat support post of said footrest assembly is pivotally mounted to said seat frame.

3. The three-wheeled wheelchair apparatus as defined in claim 2 wherein, said footrest assembly includes a support clamp slidably mounted to said at least one beam.

4. The three-wheeled wheelchair apparatus as defined in claim 3 wherein, said at least one beam is a single beam having a transverse cross-section dimension generally elliptical-shaped with a longitudinal axis oriented in a substantially vertical plane, and said support clamp includes a passageway formed and dimensioned for sliding receipt of said single beam longitudinally therethrough.

5. The three-wheeled wheelchair apparatus as defined in claim 3 wherein, said support clamp is movably mounted longitudinally along said seat support post for positioning thereof in a selected position between a fore end and aft end of said at least one beam.

6. The three-wheeled wheelchair apparatus as defined in claim 5 wherein, one of said seat support post and said support clamp includes a plurality of spaced-apart holes which cooperate with the other of said support clamp and said seat support post for providing a selective positioning of said support clamp relative said seat support post.

7. The three-wheeled wheelchair apparatus as defined in claim 1 wherein, said footrest plates are pivoted about a generally horizontal axis.

8. The three-wheeled wheelchair apparatus as defined in claim 7 wherein, said footrest plates are movably mounted longitudinally along said seat support post for positioning thereof in a selected one of a plurality of positions toward and away from said seat support post.

9. The three-wheeled wheelchair apparatus as defined in claim 8 wherein, said footrest plates include a footrest frame telescopically mounted to said seat support post.

10. The three-wheeled wheelchair apparatus as defined in claim 1 wherein, said front wheel is provided by a caster wheel pivotally mounted about a vertical axis extending through said at least one beam.

11. The three-wheeled wheelchair apparatus as defined in claim 1 wherein, one of said wheelchair frame and said seat frame includes a post mounting bracket, the bracket movably receiving a rear post member mounted to the other of said seat frame and said wheelchair frame for longitudinal positioning of said seat frame relative said wheelchair frame in a selected one of a plurality of positions generally in the direction longitudinally along said at least one beam.

12. The three-wheeled wheelchair apparatus as defined in claim 11 wherein, said post mounting bracket is fixedly mounted proximate a rear portion of said seat frame, and said post member is mounted to said wheelchair frame proximate said aft portion thereof.

13. The three-wheeled wheelchair apparatus as defined in claim 11 wherein, said post mounting bracket includes a plurality of spaced-apart holes which cooperate with the post member for providing the selective positioning of said seat frame relative said wheelchair frame.

14. The three-wheeled wheelchair apparatus as defined in claim 12 wherein, said rear post member has one portion thereof movably mounted to said post mounting bracket for said longitudinal positioning of said seat frame, and another portion of said rear post member being movably mounted to the other of said seat frame and said wheelchair frame for vertical positioning of said seat frame relative said wheelchair frame in a selected one of a plurality of vertical positions.

15. The three-wheeled wheelchair apparatus as defined in claim 14 wherein, said rear post member includes a plurality of vertically spaced-apart holes which cooperate with the other of said seat frame and said wheelchair frame for providing the selective vertical positioning of said seat frame relative said wheelchair frame.

16. The three-wheeled wheelchair apparatus as defined in claim 11 wherein, said post mounting bracket is provided by a first bracket disposed on one side of said seat frame and a laterally spaced-apart second bracket disposed on an opposite side of said seat frame, each of said first and said second brackets movably receiving a respective first and second post member for longitudinal positioning thereof in said selected one of said plurality of positions generally longitudinal along said at least one beam.

17. The three-wheeled wheelchair apparatus as defined in claim 16 wherein, said first bracket includes a plurality of spaced-apart holes which cooperate with said first post member for providing the selective positioning of said seat frame relative said wheelchair frame, and said second bracket includes a plurality of spaced-apart holes which cooperate with said second post member for providing the selective positioning of said seat frame relative said wheelchair frame.

18. The three-wheeled wheelchair apparatus as defined in claim 16 wherein, one of said wheelchair frame and said seat frame includes said first post member having one portion thereof movably mounted to said first bracket for said longitudinal-positioning of said one side of said seat frame, and another portion of said first post member being movably mounted to the other of said seat frame and said wheelchair frame for vertical positioning of said one side of said seat frame relative said wheelchair frame in a selected one of a plurality of vertical positions, and one of said wheelchair frame and said seat frame includes said second post member having one portion thereof movably mounted to said second bracket for said longitudinal positioning of said opposite side of said seat frame, and another portion of said second post member being movably mounted to the other of said seat frame and said wheelchair frame for vertical positioning of said opposite side of said seat frame relative said wheelchair frame in a selected one of a plurality of vertical positions.

19. The three-wheeled wheelchair apparatus as defined in claim 18 wherein, said first and second post members each include a plurality of vertically spaced-apart holes which cooperate with the other of said seat frame and said wheelchair frame for providing the selective vertical positioning of the respective one side and opposite side of said seat frame relative said wheelchair frame.

20. The three-wheeled wheelchair apparatus as defined in claim 11 wherein, said rear post member being movably mounted to the other of said seat frame and said wheelchair frame for vertical positioning of said seat frame relative said wheelchair frame in a selected one of a plurality of vertical positions.

21. The three-wheeled wheelchair apparatus as defined in claim 20 wherein, said rear post member is provided by a first post disposed on one side of said seat frame and a laterally spaced-apart second post disposed on an opposite side of said seat frame, each said first and said second posts being movably mounted to said wheelchair frame for vertical positioning thereof in said selected one of said plurality of vertical positions.

22. The three-wheeled wheelchair apparatus as defined in claim 21 wherein, each said first post and said second post includes a plurality of vertically spaced-apart holes which cooperate with said other of said seat frame and said wheelchair frame for providing said selected one of said plurality of vertical positions.

23. The three-wheeled wheelchair apparatus as defined in claim 1 further including:

camber adjustment mechanisms operably coupled between said wheelchair frame and each rear drive wheel to independently adjust the camber of each rear drive wheel.

24. The three-wheeled wheelchair apparatus as defined in claim 23 wherein, each said adjustment mechanism includes an axle sleeve mounted to said wheelchair frame about respective frame axes, and each said sleeve including an off-set coupling mechanism operably coupled to a respective rear drive wheel for rotation about respective rotational axes off-set from respective frame axes.

25. The three-wheeled wheelchair apparatus as defined in claim 24 wherein, each off-set of a rotational axis from a respective frame axis is about ±2°.

26. The three-wheeled wheelchair apparatus as defined in claim 24 wherein, said wheelchair frame includes a pair of arms extending outwardly from said at least one beam and formed to carry respective adjustment mechanisms on distal ends thereof.

27. The three-wheeled wheelchair apparatus as defined in claim 26 wherein, said wheelchair frame is T-shaped, and each said arm is angled upwardly, relative one another, from said at least one beam.

* * * * *

UNITED STATES PATENT AND TRADEMARK OFFICE

CERTIFICATE OF CORRECTION

PATENT NO. : 5,480,172

DATED : January 2, 1996

INVENTOR(S) : Dean W. James

It is certified that error appears in the above-indentified patent and that said Letters Patent is hereby corrected as shown below:

Claim 18, column 7, line 44, immediately preceding "positioning" delete -- - --.

Signed and Sealed this

Thirtieth Day of April, 1996

Attest:

BRUCE LEHMAN

*Attesting Officer* — *Commissioner of Patents and Trademarks*